US008848734B2

(12) United States Patent
Wilmoth et al.

(10) Patent No.: US 8,848,734 B2
(45) Date of Patent: Sep. 30, 2014

(54) SYSTEM AND METHOD OF PROVIDING TELECOMMUNICATIONS SPECIAL SERVICES TO A TELECOMMUNICATIONS CUSTOMER

(75) Inventors: Mark L. Wilmoth, Gardner, KS (US); Kendra Dwyer, Wellsville, KS (US); Kelsyn D. S. Rooks, Overland Park, KS (US); Jeffery Sweeney, Olathe, KS (US); Shekhar Gupta, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 1139 days.

(21) Appl. No.: 12/256,350

(22) Filed: Oct. 22, 2008

(65) Prior Publication Data

US 2010/0098142 A1    Apr. 22, 2010

(51) Int. Cl.
*H04M 7/00* (2006.01)
*H04M 3/00* (2006.01)

(52) U.S. Cl.
CPC ............ *H04M 3/007* (2013.01); *H04M 7/0096* (2013.01)
USPC .......................................................... 370/465

(58) Field of Classification Search
CPC ........................... H04M 3/007; H04M 7/0096
USPC .......................................... 370/465; 375/220
See application file for complete search history.

(56) References Cited

U.S. PATENT DOCUMENTS

| 5,970,130 A * | 10/1999 | Katko .................... 379/201.01 |
| 6,490,273 B1 * | 12/2002 | DeNap et al. .............. 370/352 |
| 6,738,474 B1 * | 5/2004 | Miller ..................... 379/413.03 |

OTHER PUBLICATIONS

Ericsson—"Gigabit Passive Optical Networks" Apr. 2007.*
AdTran. "High Speed Fiber Line Module" Oct. 2006.*
AdTran "OC-3" May 2000.*
Meggelen, Jim Van. "Asterisk: The Future of Telephony, Second Edition" Aug. 2007.*
SBC Southwestern Bell—ISDN Faq. 2003.*

* cited by examiner

*Primary Examiner* — Jason Mattis
*Assistant Examiner* — Stephen J Clawson
(74) *Attorney, Agent, or Firm* — Swanson & Bratschun, L.L.C.

(57) ABSTRACT

A system and method for providing telecommunications special services to customers of a communications service provider includes receiving first communications signals from customer premise equipment. The first communications signals may be processed using a special services card to generate second communications signal. The second communications signal may be communicated to a line termination unit operating externally from a BBDLC. The second communications signal may be processed by the line termination unit to generate a third communications signal. The third communications signal may be communicated to a transport card operating in the BBDLC. By externally processing special services signals from the BBDLC, bandwidth of the BBDLC may be utilized more efficiently.

13 Claims, 4 Drawing Sheets

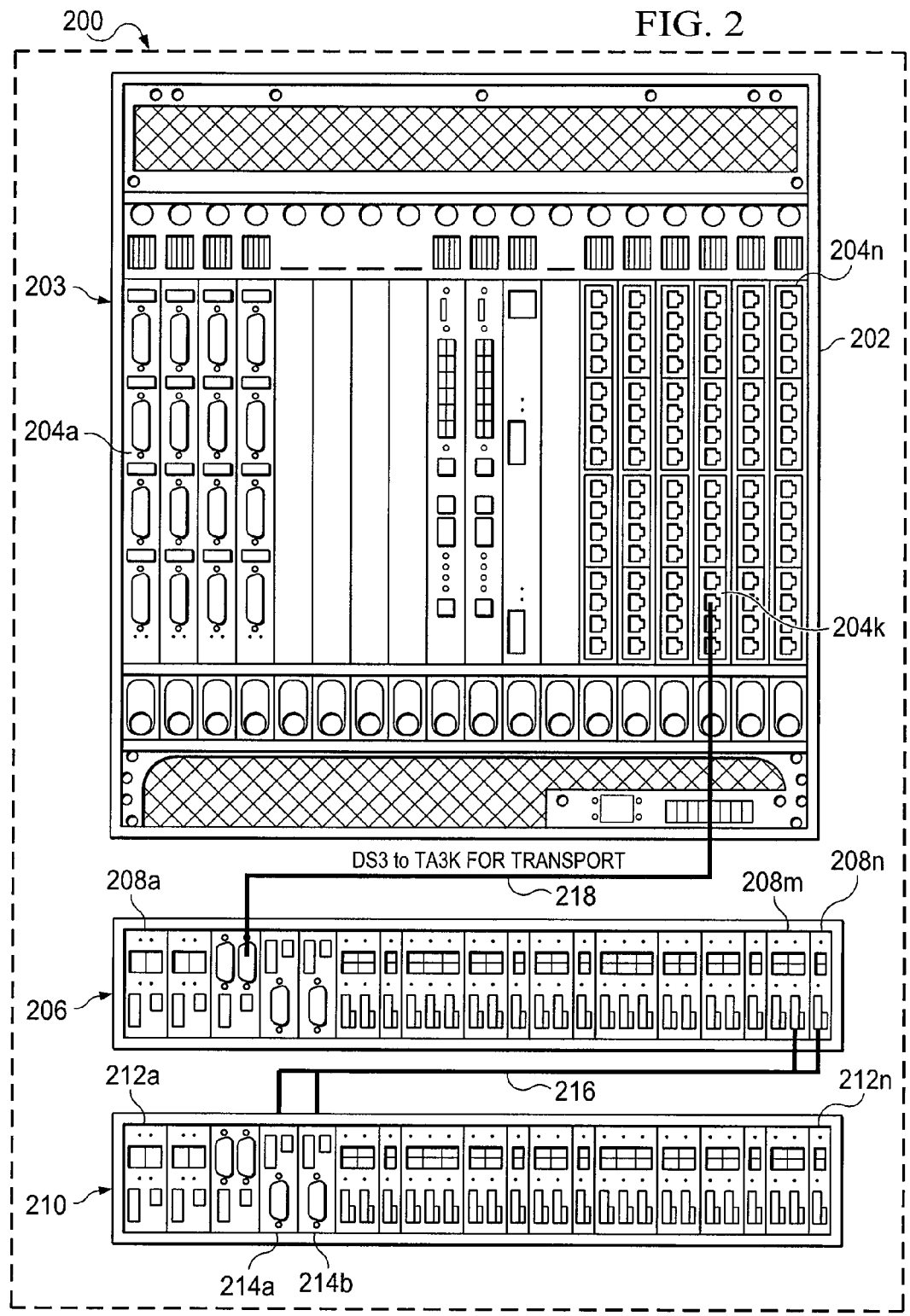

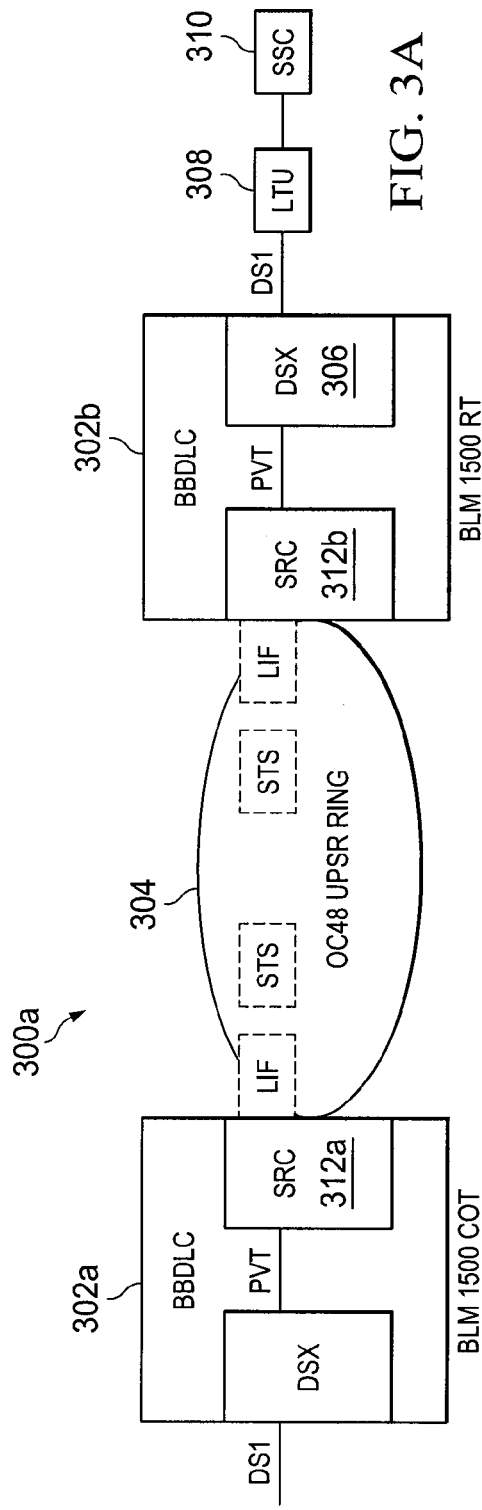
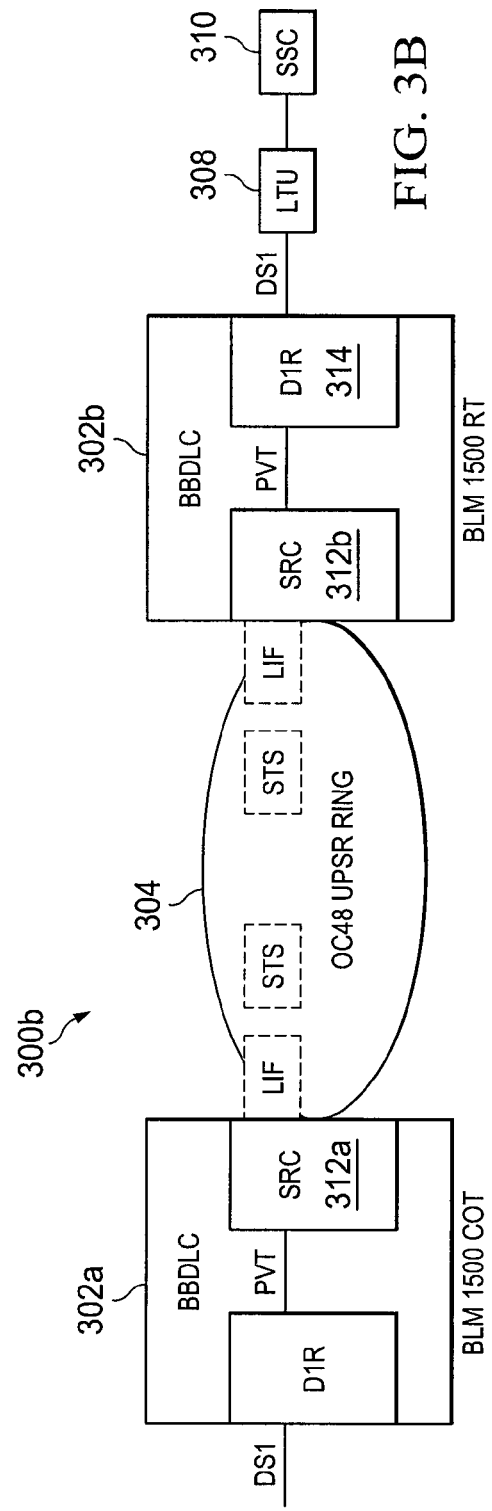
FIG. 3A
FIG. 3B

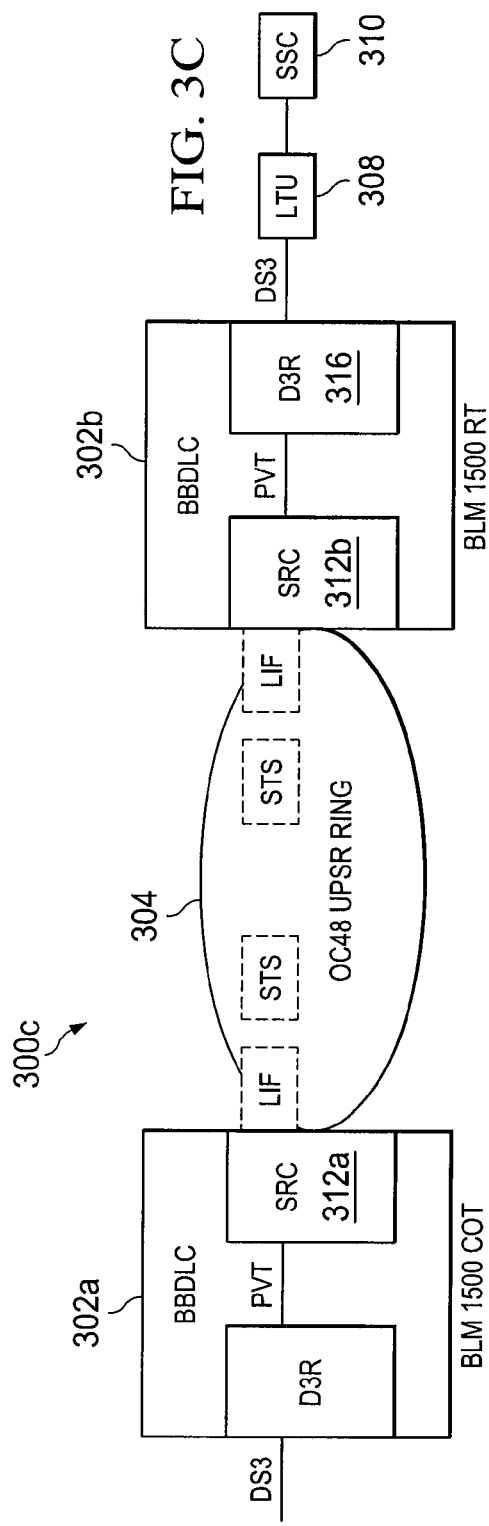
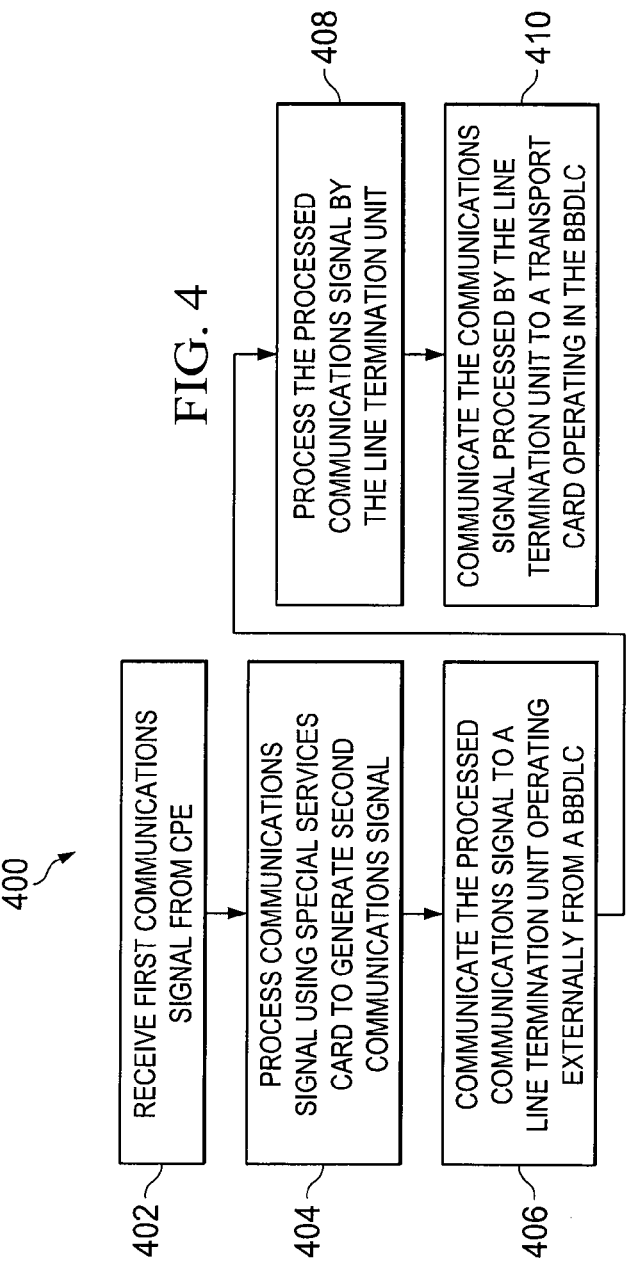

SYSTEM AND METHOD OF PROVIDING TELECOMMUNICATIONS SPECIAL SERVICES TO A TELECOMMUNICATIONS CUSTOMER

BACKGROUND

Telecommunications have advance dramatically in recent years. A significant part of the reason for the advancement has been due to telecommunications equipment having increased bandwidth such that more capabilities and services have been able to be provided to customers. While new services have developed to provide customers with ever expanding communications capabilities, legacy telecommunications special services ("special services") have to be maintained. As understood in the art, special services generally operate at significantly lower bandwidth than new telecommunications services. Today's telecommunications equipment, such as broadband digital loop carriers (BBDLCs), is configured to perform high data rate processing (e.g., 10 gigabits per second (GB) or higher) on each card within each slot of the BBDLC. However, if special services of low data rates (e.g., below 1 megabits pet second (MB)) are provided by the BBDLC by using a slot that is configured to provide high data rate processing, valuable bandwidth is lost.

SUMMARY

To overcome the problem of losing valuable bandwidth on telecommunications equipment to support legacy services to customers, the principles of the present invention provide for a BBDLC to utilize a transport card to process special services that are processed by a line termination unit and special services card that operate outside of the BBDLC. By operating the special services card outside of the BBDLC, a slot is made available to operate a telecommunications card that operates at high data rates, thereby maximizing bandwidth of the slot in the BBDLC.

One embodiment of a system for providing telecommunications special services to customer premise equipment (CPE) of a customer of a telecommunications service provider includes a broadband digital loop carrier (BBDLC) including a card cage configured with slots that operate at high bandwidth to support electronics cards that perform communications operations. A transport card may operate in the card cage, and be configured to transport data traffic to and from the BBDLC. A line termination unit may be in communication with the transport card. A channel bank may be in communication with the line termination unit. A special services card may be configured to operate within the channel bank and be configured to communicate with the CPE to provide special services to the customer. The special services card may communicate data received from the customer premise equipment via the channel bank and line termination unit to the transport card for processing by the BBDLC.

One embodiment of a method for providing telecommunications special services to customers of a communications service provider includes receiving first communications signals from customer premise equipment. The first communications signals may be processed using a special services card to generate second communications signal. The second communications signal may be communicated to a line termination unit operating externally from a BBDLC. The second communications signal may be processed by the line termination unit to generate a third communications signal. The third communications signal may be communicated to a transport card operating in the BBDLC.

One embodiment of a method for configuring a communications cabinet may include providing a BBDLC. A transport card may be configured within the BBDLC. A line termination unit may be configured externally from the BBDLC and in communication with the transport card within the BBDLC. A channel bank may be provided and a special services card may be configured in the channel bank. The special services card may further be configured to be in communication with the line termination unit to provide special services to a user.

BRIEF DESCRIPTION OF THE DRAWINGS

Illustrative embodiments of the present invention are described in detail below with reference to the attached drawing figures, which are incorporated by reference herein and wherein:

FIG. 2 is an illustration of an illustrative BBDLC cabinet configured to provide special services;

FIGS. 3A-3C are illustrations of illustrative network configurations utilizing the special services configuration in accordance with the principles of the present invention; and FIG. 4 is a flow diagram of an illustrative process for providing special services in accordance with the principles of the present invention.

DETAILED DESCRIPTION OF THE DRAWINGS

Figure 1:
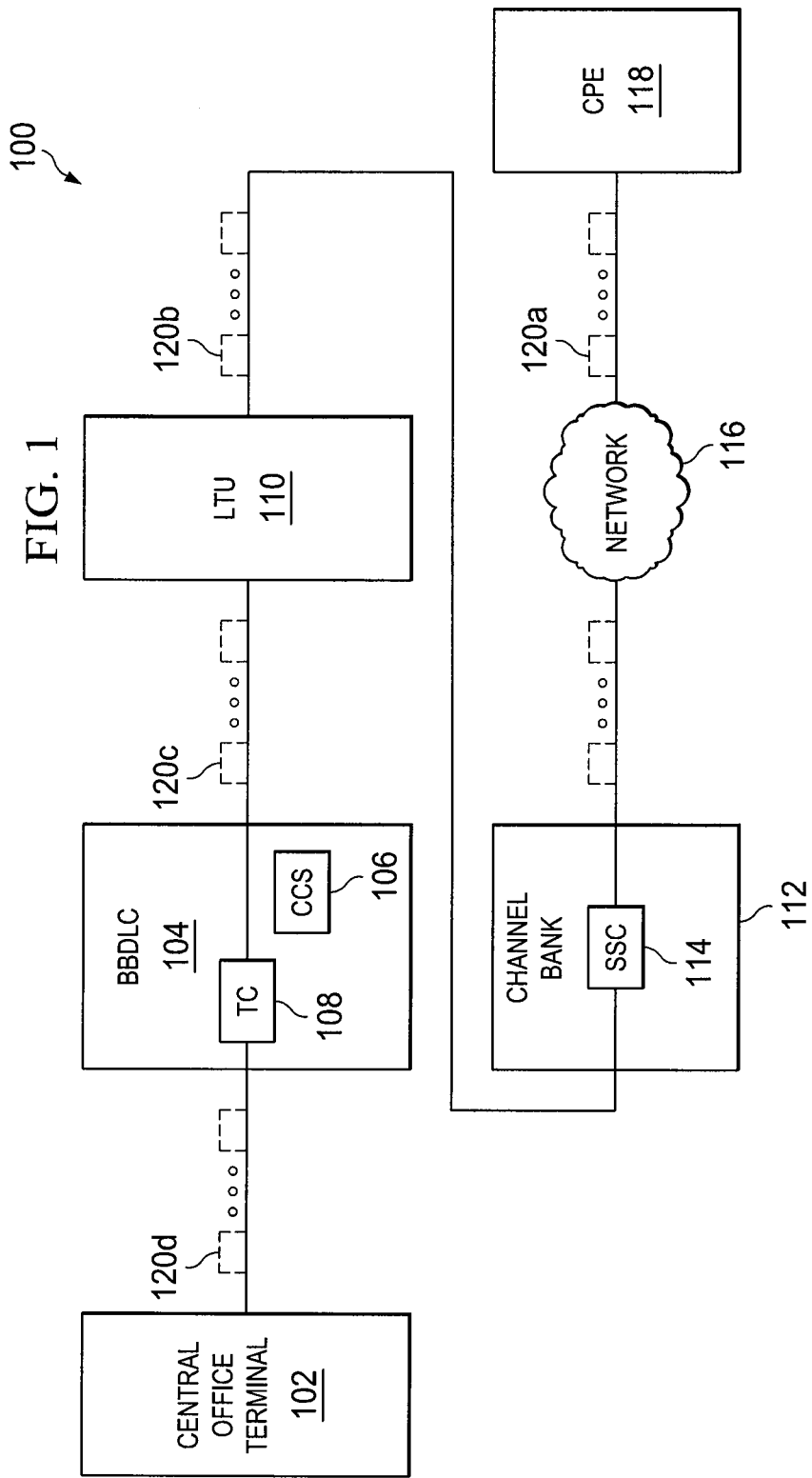
FIG. 1 is a block diagram of an illustrative system configuration for providing special services.

FIG. 1 is a block diagram of an illustrative system 100 configured to provide special services. The system 100 includes a central office terminal 102 that operates within a central office of a telecommunications service provider. A BBDLC 104 may operate communications cards 106 and a transport card 108. The BBDLC 104 operates communications cards 106 at high data rates, such as 10 GB or higher. The communications cards 106 are capable of performing a variety of communications functions, as understood in the art. In one embodiment, the BBDLC 104 is an BLM 1500 produced by Ericsson.

The transport card 108 is configured to communicate with a variety of external devices. A line termination unit 110 is in communication with the transport card 108. As shown, the line termination unit 110 is external from the BBDLC 104. The line termination unit 110 operates at relatively low bandwidth as compared to the communications cards 106. In one embodiment, the line termination unit 110 is an AdTran TA-3000, which is commercially available. In one embodiment, the transport card 108 is a Sonet OC-48 card.

A channel bank 112 may be in communication with the line termination unit 110. The channel bank 112 operates a special services card 114, which is configured to provide a variety of special services to customers. The special services card 114 operates at T1 or DSL rates, such as 64 kilo bits per second (Kbps). By positioning the special services card 114 remotely or outside of the BBDLC 104, a card slot that is capable of providing 10 GB bandwidth would have otherwise been utilized by a low bandwidth special services card. The special services card 114 communicates via a network 116 with customer premise equipment 118 located at a customer location. The CPE 118 may be any telecommunications equipment that utilizes special services.

Special services may include locally switched services (LSS), non-locally switched services (NLSS), and non-switched services (NSS), for example. The locally switched services may include: Centrex lines, PBX trunks, WATS line out, WATS trunk out, WATS line 2-way, WATS trunk 2-way, direct-out-dialing (DOD) trunks, direct inward dialing (DID) trunks, 800 service line, and 800 service trunk. The non-locally switched services may include: Centrex lines, foreign exchange (FX) lines, foreign exchange trunks, WATS line out, WATS trunk out, WATS line 2-way, WATS trunk 2-way, 800 service line, 800 service trunk, foreign exchange, DID trunks, off-premises extensions, and secretarial lines. Non-switched services may include: PBX tie trunks, off-premises stations, digital data four-wire private line data at 2.4 Kbps, 4.8 Kbps, 9.6 Kbps, and 56 Kbps, and integrated services digital network (ISDN) with basic access service. Special services should not be considered limited to these examples.

In operation, the CPE 118 communicates communications signals 120a using data packets, such as time-division multiplexed (TDM) data packets, via the network 116 to the channel bank 112. The communications signals 120a are received and processed by the special services card 114, which communicates the processed communications signals 120b to the line termination unit 110. The line termination unit 110 processes the communications signals 120b for communication of communications signals 120c to the transport card 108 operating in the BBDLC 104. The transport card 108 processes the communications signals 120c and communicates processed communications signals 120d to the central office terminal 102 for processing and/or routing. In one embodiment, the communications signals 120a, 120b, 120c and/or 120d (collectively 120) are the same. Alternatively, the communications signals 120a, 120b, 120c, and 120d may be different in that data, such as header data, may be added or removed after processing by each of the special services card 114, line termination unit 110, and/or transport card 108. It should be understood that other electronics for communicating the communications signals 120a-120d may also be included in the communications path.

FIG. 2 is an illustration of an illustrative telecommunications cabinet 200 configured to provide special services. The telecommunications cabinet 200 may include a BBDLC 202 that includes a card cage 203 that includes slots for communications cards 204a-204n (collectively 204) to be inserted for operation, as understood in the art. Each communications card 204 in the card cage 203 may operate at processing speeds up to 10 GB or higher.

A line termination unit 206 may be configured with line termination cards 208a-208n (collectively 208). The line termination cards 208 may be configured to receive and process communications signals. The line termination cards 208 may operate at T1 and T3 rates.

A channel bank 210 may be configured to operate cards 212a-212n, which may include one or more special services cards 214a-214b (collectively 214). In one embodiment, the channel bank 210 is a AdTran ACT-1900. The special services cards 214 may communicate with line termination units 208m and 208n via a communications path 216. Line termination cards 208m and 208n may communicate with one or more transport card, such as transport card 204k, operating in the BBDLC 202 via communications path 218. The communications path 218 may utilize a communications protocol, such as DS3, T1, HDSL, or any other communications protocol, as understood in the art.

FIGS. 3A-3C are illustrations of illustrative network configurations 300a-300c utilizing the special services configuration in accordance with the principles of the present invention. As shown, two BBDLCs 302a and 302b may be configured in an OC48 unidirectional path switched ring (UPSR) 304. The BBDLC 302a operates at a central office of a telecommunications service provider and the BBDLC 302b operates to provide special services by including transport card 306, such as a digital cross-connect (DSX), that communicates with a line termination unit 308, such as an AdTran TA-3000. The line termination unit 308 communicates with a special services card 310. As shown in FIG. 3A, a DS1 communications line operates between the line termination unit 308 and BBDLC 302b. In one embodiment, SRCs 312a and 312b are optical cards for communicating signals over the UPSR 304. In FIGS. 3B and 3C, a D1R transport card 314 is used for providing a DS1 communications line and D3R card is used for providing a DS3 communications line, respectively. It should be understood that a wide variety of transport cards, line termination units, and special services cards may be utilized to provide the same or analogous functionality in offloading low bandwidth communications in providing special services from the BBDLC 302b.

FIG. 4 is a flow diagram of an illustrative process 400 for providing special services in accordance with the principles of the present invention. The process 400 starts at step 402, where a first communications signal is received from a CPE. At step 404, the communications signal is processed using a special services card to generate a processed communications signal. The processed communications signal may be communicated to a line termination unit at step 406, where the line termination unit is operating externally from a BBDLC. At step 408, the line termination unit processes the processed communications signal, and communicates the communications signal it processed to a transport card operating in the BBDLC at step 410. By utilizing the process 400, an operator of the BBDLC does not have to utilize a high-speed (i.e., high bandwidth) slot in the BBDLC to process low-speed (i.e., low bandwidth) communications signals, such as communications signals that provide special services to a customer. It should be understood that the process 400 may operate in reverse when communicating communications signals for special services to a customer.

Although particular embodiments of the present invention have been explained in detail, it should be understood that various changes, substitutions, and alterations can be made to such embodiments without departing from the spirit and scope of the present invention as defined solely by the following claims.

What is claimed:

1. A method for providing telecommunications special services to customers of a communications service provider, said method comprising:
receiving a first communications signal from customer premise equipment wherein the first communication signal is a special services signal sent at a rate of less than 1 gigabit per second;
processing the first communications signal using a special services card to generate a second communications signal;
communicating the second communications signal to a line termination unit operating externally from a BBDLC wherein the BBDLC operates communications cards at data rates of at least 10 gigabits per second;
processing the second communications signal by the line termination unit to generate a third communications signal; and
communicating the third communications signal to a transport card operating in the BBDLC wherein the special services card, line termination unit and BBDLC are configured within a communication cabinet.

2. The method according to claim 1, further comprising communicating the third communications signal to a central office terminal.

3. The method according to claim 1, wherein processing the first communications signal includes processing the first communications signal at a data rate less than one-thousandth that of a maximum data rate of a slot in the BBDLC.

4. The method according to claim 1, wherein processing the first communications signal includes processing a locally switched services communications signal.

5. The method according to claim 1, wherein processing the first communications signal includes processing non-locally switched services communications signal.

6. The method according to claim 1, wherein processing the first communications signal includes processing non-switched services communications signal. signal.

7. A system for providing telecommunications special services to customer premise equipment (CPE) of a customer of a telecommunications service provider, said system comprising:
- a broadband digital loop carrier (BBDLC) including a card cage configured with slots that operate to support electronics cards that perform communications operations at data rates of at least 10 gigabits per second;
- a transport card operating in the card cage within the BBDLC, and configured to transport special services to and from the BBDLC;
- a line termination unit in communication with and connected to said transport card wherein the line termination unit is operating externally from the BBDLC;
- a channel bank in communication with and connected to said line termination unit; and
- a special services card that performs communication operations at data rates of less than 1 gigabit per second operating within said channel bank and configured to communicate with the CPE to provide special services to the customer, said special services card communicating data received from the customer premise equipment via said channel bank and line termination unit to the transport card for processing by the BBDLC wherein the BBDLC, line termination unit, channel bank, and special services card are configured within a communications cabinet.

8. The system according to claim 7, wherein said line termination unit is configured to provide T1 communications.

9. The system according to claim 7, wherein said line termination unit is configured to provide HDSL communications.

10. The system according to claim 7, wherein said special services card is configured to provide locally switched services.

11. The system according to claim 7, wherein said special services is configured to provide non-locally switched services.

12. The system according to claim 7, wherein said special services is configured to provide non-switched services.

13. The system according to claim 7, wherein said special services card is configured to operate at a data rate less than one-thousandth of a maximum data rate of a slot in the card cage.

* * * * *